United States Patent
Tulpule et al.

(10) Patent No.: US 10,971,017 B2
(45) Date of Patent: Apr. 6, 2021

(54) SENSOR FUSION AND INFORMATION SHARING USING INTER-VEHICLE COMMUNICATION

(71) Applicant: Cummins Inc., Columbus, IN (US)

(72) Inventors: Pinak Jayant Tulpule, Pune (IN); Govindarajan Kothandaraman, Columbus, IN (US); Edmund P. Hodzen, Columbus, IN (US); Kenneth M. Follen, Greenwood, IN (US); Archit N. Koti, Columbus, IN (US)

(73) Assignee: Cummins Inc., Columbus, IN (US)

( * ) Notice: Subject to any disclaimer, the term of this patent is extended or adjusted under 35 U.S.C. 154(b) by 132 days.

(21) Appl. No.: 16/176,805

(22) Filed: Oct. 31, 2018

(65) Prior Publication Data

US 2019/0130765 A1     May 2, 2019

Related U.S. Application Data

(60) Provisional application No. 62/579,527, filed on Oct. 31, 2017.

(51) Int. Cl.
| | | |
|---|---|---|
| *G08G 1/00* | (2006.01) | |
| *G08G 1/0967* | (2006.01) | |
| *H04W 4/44* | (2018.01) | |
| *H04W 4/46* | (2018.01) | |
| *G05D 1/02* | (2020.01) | |

(52) U.S. Cl.
CPC ............ *G08G 1/22* (2013.01); *G05D 1/0291* (2013.01); *G08G 1/096775* (2013.01); *G08G 1/096791* (2013.01); *H04W 4/44* (2018.02); *H04W 4/46* (2018.02); *G05D 2201/0213* (2013.01)

(58) Field of Classification Search
CPC ...... G08G 1/00; G08G 1/0967; G08G 1/0968; G06K 9/00; F16H 61/02; G06G 7/70; G01C 21/32; G06F 7/00
See application file for complete search history.

(56) References Cited

U.S. PATENT DOCUMENTS

| | | | |
|---|---|---|---|
| 6,338,011 B1 | 1/2002 | Furst et al. | |
| 6,889,171 B2 | 5/2005 | Skrbina et al. | |
| 7,283,904 B2 | 10/2007 | Benjamin et al. | |
| 7,340,380 B2 | 3/2008 | Klotz et al. | |
| 7,460,951 B2 | 12/2008 | Altan et al. | |
| 7,739,006 B2 | 6/2010 | Gillula | |
| 8,063,793 B2 | 11/2011 | Shrum, Jr. | |
| 8,180,558 B1* | 5/2012 | Marko | G08G 1/012 701/119 |
| 8,467,928 B2 | 6/2013 | Anderson | |
| 8,548,731 B2 | 10/2013 | Ruizenaar | |
| 9,176,924 B2* | 11/2015 | Ricci | G06F 3/0481 |
| 9,261,882 B2 | 2/2016 | Kim et al. | |
| 9,454,903 B2 | 9/2016 | Sobue et al. | |
| 9,547,989 B2 | 1/2017 | Fairfield et al. | |
| 2015/0345621 A1* | 12/2015 | Sujan | F16H 61/0213 701/58 |

(Continued)

*Primary Examiner* — Yuri Kan

(74) *Attorney, Agent, or Firm* — Taft Stettinius & Hollister LLP

(57) ABSTRACT

Methods, systems and apparatuses for inter-vehicle communication, fusion of sensor information, and information sharing resulting from inter-vehicle communication are disclosed along with control of one or more vehicles in response to information from one or more other vehicles.

20 Claims, 2 Drawing Sheets

(56) References Cited

U.S. PATENT DOCUMENTS

| | | | |
|---|---|---|---|
| 2016/0042239 A1* | 2/2016 | Fowe | G06K 9/00785 |
| | | | 382/104 |
| 2016/0189544 A1* | 6/2016 | Ricci | G08G 1/0116 |
| | | | 701/117 |
| 2017/0010104 A1* | 1/2017 | Aviel | G05D 1/0221 |
| 2017/0025017 A1 | 1/2017 | Thomas et al. | |
| 2019/0019409 A1* | 1/2019 | Farr | G08G 1/0965 |

* cited by examiner

SENSOR FUSION AND INFORMATION SHARING USING INTER-VEHICLE COMMUNICATION

CROSS-REFERENCE TO RELATED APPLICATION

The present application claims the benefit of the filing date of U.S. Provisional Application Ser. No. 62/579,527 filed on Oct. 31, 2017, which is incorporated herein by reference.

TECHNICAL FIELD

The present invention generally relates to a vehicle control architecture, and more particularly, but not exclusively, to fusion of sensor information and sharing of information using inter-vehicle communication.

BACKGROUND

Operating vehicles autonomously and/or in cooperation with one or more surrounding vehicles is an area of interest. Some existing systems have various shortcomings relative to certain applications. Accordingly, there remains a need for further contributions in this area of technology.

SUMMARY

Embodiments of the present application include methods, systems and apparatuses for inter-vehicle communication, fusion of sensor information, and information sharing resulting from inter-vehicle communication. Other embodiments include apparatuses, systems, devices, hardware, methods, and combinations for control of one or more vehicles in response to information from one or more other vehicles. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
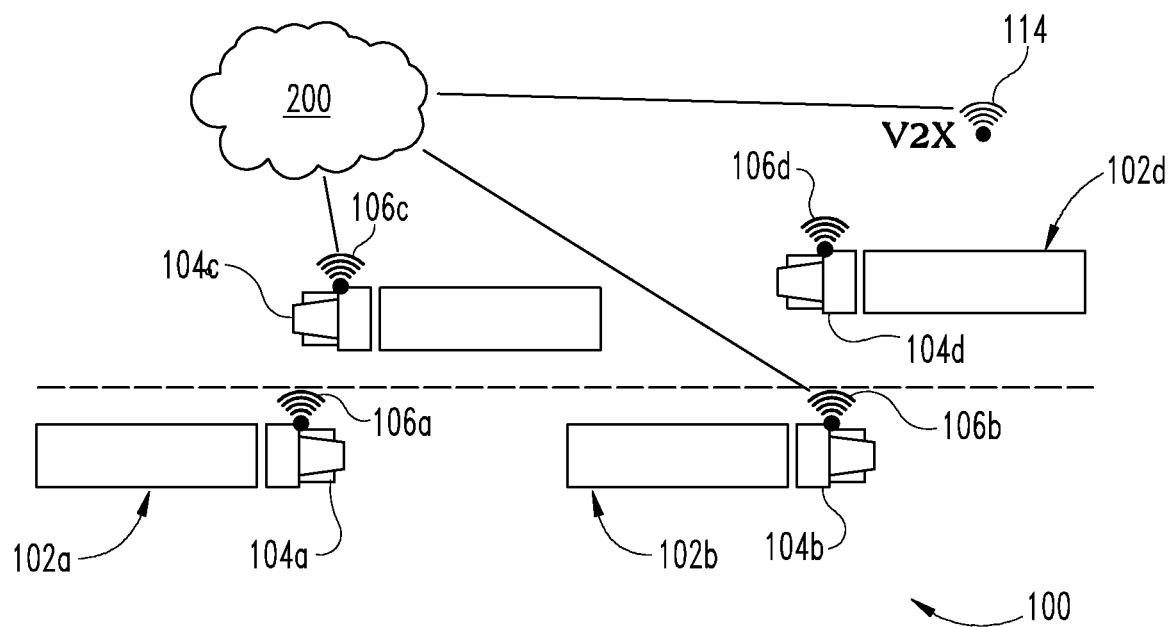
FIG. 1 depicts an embodiment of a plurality of vehicles in communication with one another.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic view of an example vehicle system 100 with a number of vehicles 102a, 102b, 102c, 102d (also collectively and individually referred to herein as vehicle(s) 102) each including a powertrain, such as an internal combustion engine, an electric motor, or a combination thereof (such as a hybrid vehicle), structured to generate power for the respective vehicle 102 of the vehicle system 100. The vehicles 102 of the vehicle system 100 can sometimes be referred to as a truck, a tractor-trailer semi, etc. but no limitation is hereby intended to limit the vehicle system 100 to a truck, or tractor-trailer semi, etc. Thus, the term vehicle system 100 or other vehicle designation is intended to cover a wide range of vehicles such as trucks, semis, tractor-trailers, box trucks, dump trucks, busses, passenger cars, etc. The vehicle system 100 illustrated in FIG. 1 includes vehicles that are depicted as tractor trailers, but any type of vehicle is thus contemplated herein. Several vehicles can operate in a vehicle system 100 in which the vehicles act together to reduce overall fuel costs and improve operation. Although only four vehicles 102 for vehicle system 100 are illustrated, any number of vehicles can be used.

In one embodiment, all or a portion of vehicles are in a platoon arrangement, such as vehicles 102a, 102b. In other embodiments, the vehicles are not platooned by are linked by being within a predetermined distance from one another. Platooning vehicles can be described as a state where a series of vehicles such as vehicles 102a, 102b are linked together by telematics, GPS, or any suitable inter-vehicle communication system 106a, 106b, respectively, where the vehicle units communicate to traverse along a route in a line as an operational cost efficient strategy. In certain embodiments, the lead vehicle 102a may be equipped with aerodynamic capability (wind assist panels on cab & trailer, aerodynamic tractor body) that creates a laminar flow of air (tunnel or slipstream effect) that greatly reduces air drag. The following vehicles 102b, etc. are spaced close enough to the lead vehicle 102a taking advantage of the "tunnel" or "slip stream" increasing fuel economy. The vehicles may be autonomous vehicles without a driver, or include a driver with an advanced driver assist system that directs or provides information to the driver to maneuver the vehicle in the vehicle system 100.

Each vehicle 102 in the vehicle system 100 can include a vehicle controller 104a, 104b, 104c, 104d (collectively and individually referred to as vehicle controller 104) respectively, that is used to regulate various aspects of the vehicle operation as discussed further herein. The vehicle controllers 104 can each be a single device or alternatively composed of a number of separate devices acting in concert. The vehicle controllers 104 can be comprised of digital circuitry, analog circuitry, or a hybrid combination of both of these types. Also, the vehicle controllers 104 can be programmable, an integrated state machine, or a hybrid combination thereof. The vehicle controllers 104 can include one or more Arithmetic Logic Units (ALUs), Central Processing Units (CPUs), memories, limiters, conditioners, filters, format converters, or the like which are not shown to preserve clarity. In one form, the vehicle controllers 104 are of a programmable variety that execute algorithms and process data in accordance with operating logic that is defined by programming instructions (such as software or firmware). Alternatively or additionally, operating logic for the vehicle controllers 104 can be at least partially defined by hardwired logic or other hardware.

As shown in FIG. 1, an exemplary cloud computing control system 200 can be provided that is useful to control various aspects of vehicle system 100. Cloud computing control system 200 can also be configured to communicate with one or more of the vehicles 102 of vehicle system 100. Cloud computing control system 200 can also be configured to communicate with one or more of the vehicles 102 in a vehicle system 100 operating within a platoon system and/or outside of a platoon system.

In one form the cloud computing control system 200 includes one or more cloud computing platforms or servers that communicate all or a portion of the vehicles 102 in vehicle system 100 and/or across multiple vehicle systems 100 that are remote from one another and/or that include vehicles that are incapable of inter-vehicle communication or outside of inter-vehicle communication range. The cloud computing control system 200 may comprise a wireless communication system allowing a person, device or system remote from the vehicles of the vehicle system 100 to input information such as the external data discussed further below to the cloud computing control system 200. The cloud computing control system 200 can communicate with all or a portion of the vehicle controllers 104 over a wireless connection, such as a Wi-Fi or cellular connection. However, any suitable connection is contemplated.

Figure 2:
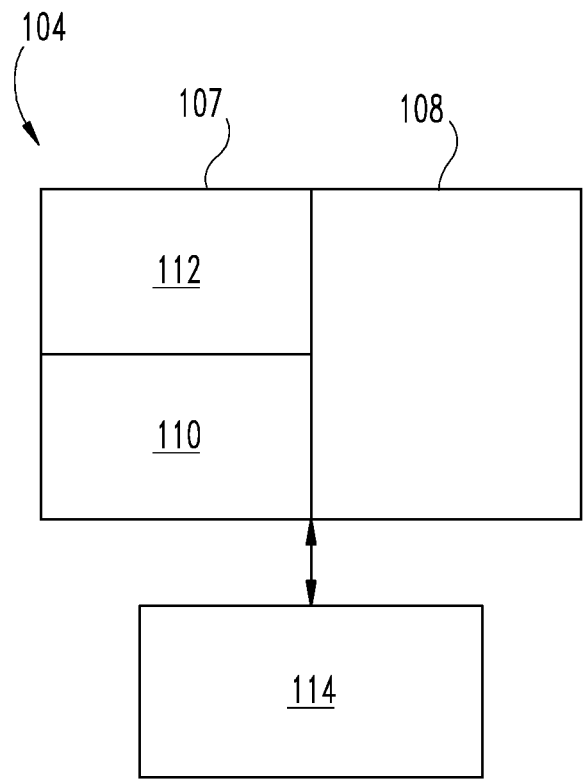
FIG. 2 depicts an embodiment of a control system.

As shown in FIG. 2, the vehicle controller 104 can include one or more of the following (depending on the capabilities of any given vehicle system 100) for controlling the powertrain (PT) of the vehicle 102: an engine (or powertrain) control module (ECM) 107 and a transmission control module 108. The engine or powertrain control module 107 can include, for example, a vehicle speed controller 110 and operating lever controller 112. The operating lever controller 112 can control combustion management, fuel, air handling and thermal management operating levers that may be appropriate for the respective vehicle 102.

The vehicle controllers 104 may also include additional or alternate controllers including, for example, aftertreatment system controllers and vehicle system controllers, among others. The vehicle controllers 104 may be structured to control a number of aspects of the operation of the powertrain and other associated elements of respective vehicle 102 including, for example, air handling, energy storage and discharge, provision of a first fuel type and exhaust aftertreatment, among other aspects.

The vehicle controllers 104 can also communicate vehicle-to-vehicle or vehicle-to-X (V2X) to provide vehicle specific data. For example, a V2X communication system 114 can communicate external information and internal information such as vehicle speed, vehicle acceleration, proximity or spacing distance between vehicles 102, and other information, between vehicle controllers 104 and/or between cloud control system 200. Vehicle controller 104 can also receive inputs regarding the external and internal information that include vehicle specific factors for the other vehicles 102, such as a speed of another vehicle, grade, other vehicle proximity, directional information, lane data, gear status, etc. Inputs can be received from sensors on the vehicle 102 to which the input is provided, from surrounding vehicle(s) 102, and/or from cloud control system 200.

The internal information can include information about vehicle components and immediate surrounding of the vehicle 102 that change over time and are available only at a given distance. The information can be derived from onboard sensors and communications with vehicle powertrain components. Example of internal information include engine speed, vehicle speed, vehicle/component temperature, humidity, current grade, ambient conditions, etc.

The external information can include, for example, various driving factors. The driving factors can include, for example, static driving factors about things outside the vehicle that do not change with time or that change slowly (e.g. daily or weekly). Example static driving factors include map based data, communications with devices outside of a vehicle, such as road or route grade, intersections, entrance and exit ramps, road curvature, charging locations, fueling locations, construction areas, speed limits, stop sign locations, route patterns (e.g. change in lane pattern/numbers, merging lanes, etc.) The external information can also include information about things outside the vehicle that change frequently over time and that may include dynamic driving factors, such traffic conditions (flow and/or density), speed limits, wind conditions, weather conditions, traffic signal conditions/phases, fuel/electricity price, etc.

The vehicle controllers 104 can include or be connected to, for example, a vehicle input (VI) system, a human-machine interface (HMI) system, a GPS system, V2X communication system 114, and a vehicle proximity sensor (VPS) system.

A VI system can provide information pertaining to vehicle control commands to the respective vehicle controller 104. The provided information may include brake pedal position information, accelerator pedal position information, cruise control setting information, and other information provided by one or more vehicle control devices or systems. The vehicle controller 104 may process the received information to determine additional information including, for example, brake pedal position rate of change information, brake pedal actuation frequency information, accelerator pedal position rate of change information, and accelerator pedal actuation frequency information. In certain embodiments cloud computing control system 200 processes the received information and such additional information may be determined by cloud computing control system 200 prior to being provided to the vehicle controller 104.

The vehicle controller 104 may utilize the information received from cloud computing control system 200 and/or from one or more other vehicle controllers 104 in determining commands for controlling various operational aspects of vehicle system 100, for example, engine control commands, fueling control commands, transmission shift commands, and brake actuation commands, among others.

A GPS system can provide information pertaining to vehicle location to cloud computing system 200 and/or vehicle controller 104. The vehicle location information may be received by a receiver of cloud computing system 200 and/or vehicle controller 104 as a wireless signal from a satellite-based global positioning system.

The V2X system 114 provides information received from one or more of the vehicles 102 to one or more of the other vehicles 102. The information may be received by a receiver or transceiver of V2X system 114 as a wireless communication signal from a variety of different sources equipped with a wireless transmitter or transceiver including, for example, other vehicles, traffic lights and other traffic signals, utility grid devices or systems, stationary transceivers in communication with other communication networks and remote servers or human-staffed computing systems also in communication with the other communication networks. The provided information may include information related to road or traffic signal conditions, information related to speed, acceleration and spacing between vehicles.

Cloud computing control system 200 and V2XV system 114 may be utilized in connection with intelligent transport systems (ITS) which comprise systems that integrate information and communication technologies with transportation infrastructure to improve economic performance, safety, mobility and environmental sustainability. An exemplary ITS system may include three operational layers: a data collection layer, a data aggregation and translation layer and an information dissemination layer. The data collection layer may include one or more elements of clouding computing control system 200 as well as devices and systems on a plurality of vehicles which sense and transmit data associated a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspects, the received data may include information about road grade, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include one or more elements of cloud computing control system 200 as well as devices and systems on a plurality of vehicles which receive information transmitted from the data aggregation and translation layer. The received information may include road grade information, information about traffic speed over a given segment of roadway, as well as information about weather conditions such as wind speed, precipitation and road conditions may be derived. ITS information from one or more of the foregoing layers may be received by one or all of the vehicles in the vehicle system 100 and provided to the respective vehicle controller(s) 104.

A proximity sensor system may provide information pertaining to other vehicles or objects within a sensor range to the corresponding vehicle. The provided information may include distance to one or more vehicles 102 or objects in sensor range, velocity of one or more vehicles 102 or objects in sensor range, and acceleration of one or more vehicles 102 or objects in sensor range. One or more of the aforementioned systems and/or other useful systems, can be used to exchange information between the vehicles 102 and the cloud computing control system 200.

In one embodiment, multiple vehicles 102 in inter-vehicle communication range can form a swarm of sensors and share readings from different internal and external information sensors for each of the multiple vehicles 102, including real or virtual sensors, such as weather data including ambient temperature, pressure, humidity, wind direction, as well as other sensors that provide external dynamic information such as cameras, radars, GPS locations, etc.

Such information can be used to understand sensor variation and diagnose sensor errors such as bias, and then correct it in a control algorithm. For example, if the same vehicles 102 spend sufficient time around each other, internal and external information can be collected for these vehicles 102 and used to improve measurement accuracy and awareness of weather by averaging the information, fusing the sensor data, or via some other estimation algorithm via vehicle controller 104 and/or cloud control system 200.

Cumulative information from external dynamic sensors can improve the understanding of the surroundings/environment by averaging sensor outputs, fusing the sensor outputs, or other data evaluation algorithm, either on a vehicle controller and/or on cloud control system 200.

Multiple vehicles 102 in inter-vehicle communication range can share powertrain specifications and identify common characteristics. Based on common characteristics the algorithms then can compare powertrain specific sensors (internal information) along with weather/external information to identify system-to-system variations, aging characteristics and update the sensor processing algorithms and/or sensor output to make use of this information.

In another embodiment, multiple vehicles 102 in inter-vehicle communication range can share external static information such as from a map database or point information from the map database, such as instantaneous road grade, road speed limits, road curvature, and historical data at that location. This information can then be used to compare map databases of the vehicles 102 and select correct/updated information and the best control action based on it, such as calibrating transmission grade bias. This information can also be used for vehicles 102 where the map database is out of date or faulty, and determining whether the faulty map database is due to faulty GPS, faulty hardware or software on the vehicle controller 104.

In yet another embodiment, multiple vehicles 102 in inter-vehicle communication range can share information about their respective sensor inputs, such as road grade, wind, and further share estimated vehicle characteristics determined by vehicle controller 104, such as mass, aero drag coefficient and other powertrain signals that are used in determining the estimate. Upon receiving the signals from other vehicles 102, a vehicle controller 104 of at least one of the vehicles 102 compares the signals and associated computations with its own computations to improve the estimation of that vehicle's characteristics. For example, a difference in grade information between two vehicles at the same location can be used to improve or update a sensor output for a grade estimate, which then leads to improved mass prediction based on the grade estimate. In another example, a difference in weather information such as wind or humidity, between two vehicles 102 at the same point helps in improving weather estimates, which can then lead to improved aero drag predictions.

The present disclosure involves sharing and processing sensor data from multiple vehicles and external sources to improving accuracy of measured data or act as a new sensor for other vehicles. Sensor outputs or information from multiple sensors across multiple vehicles and/or external sources are used to improve sensor accuracy, or improve accuracy regarding derived characteristics about vehicle and powertrain components that rely on the sensor information. In addition, sensors/maps that have faulty outputs can be diagnosed and updated using information from another vehicle sensor to improve sensor accuracy, perform sensor diagnostics, and/or improve estimation of a vehicle's powertrain characteristic using information from other vehicle sensors.

Other examples of vehicle control systems are disclosed in U.S. Provisional Application Ser. No. 62/579,478 filed on Oct. 31, 2017, which is incorporated herein by reference for all purposes.

Figure 3:
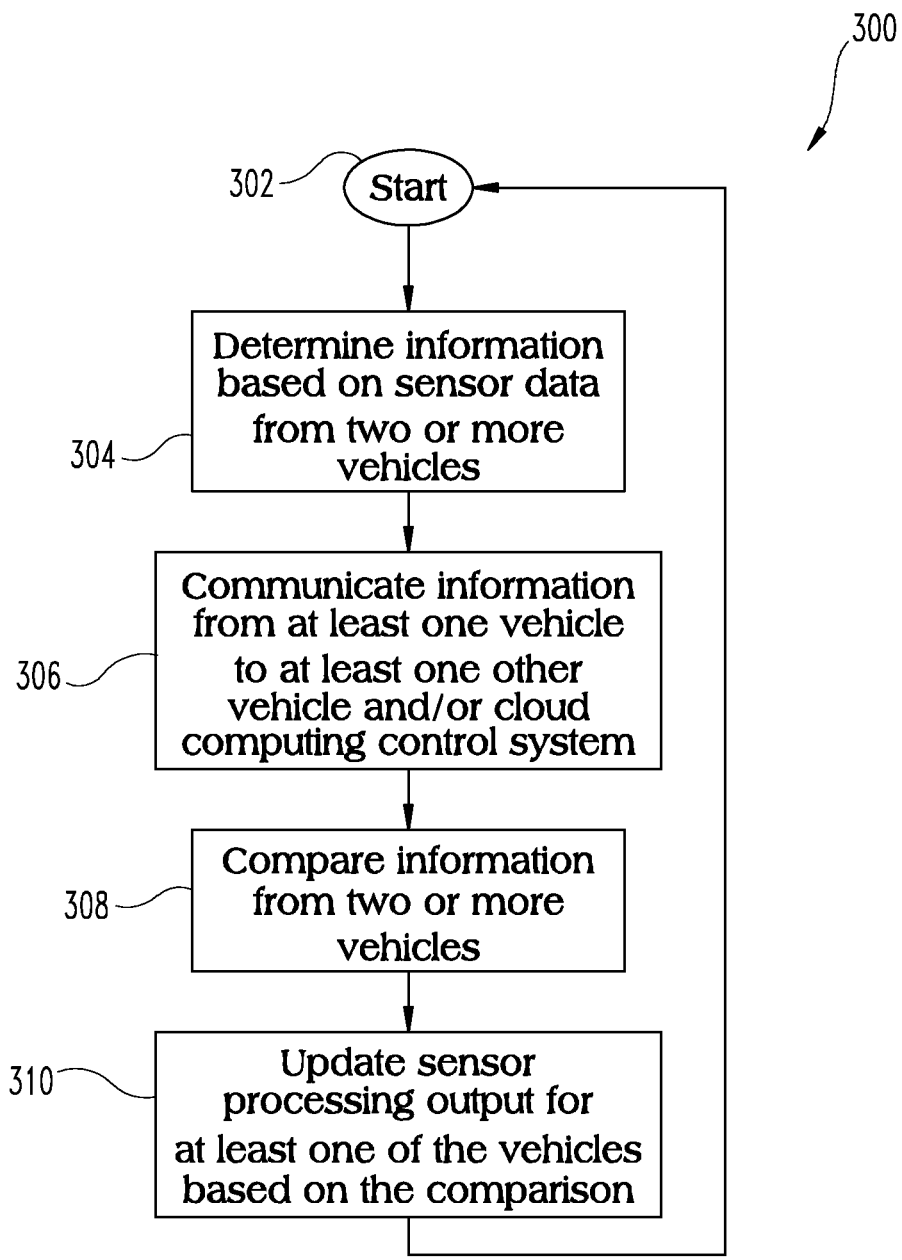
FIG. 3 depicts an embodiment of a control process which may be performed by the control system of FIG. 2.

With reference to FIG. 3, there is illustrated a block diagram of exemplary control process 300 which may be implemented in connection with one or more of the vehicle controllers 104 and/or the cloud control system 200. Control process 300 begins at start 302 and proceeds to block 304 to determine information based on sensor data with two or more vehicles. For example, the information may include, as discussed above, external information and internal information such as vehicle speed, vehicle acceleration, proximity or spacing distance between vehicles 102, and other information, between vehicle controllers 104 and/or between cloud control system 200. The information may also include external and internal information that include vehicle specific factors for the other vehicles 102, such as a speed of another vehicle, grade, other vehicle proximity, directional information, lane data, gear status, etc. Process 300 proceeds from block 302 to block 306.

Block 306 communicates information from at least one vehicle to at least one other vehicle and cloud computing control system. For example, multiple vehicles 102 in inter-vehicle communication range can form a swarm of sensors and share readings from different internal and external information sensors for each of the multiple vehicles 102, including real or virtual sensors, such as weather data including ambient temperature, pressure, humidity, wind direction, as well as other sensors that provide external dynamic information such as cameras, radars, GPS locations, etc. Process 300 proceeds from block 306 to block 308.

Block 308 compares information from the sensors of two or more vehicles. For example, upon sensor data signals from two or more of the vehicles 102, one or more of the vehicle controllers 104 of the vehicles 102 and/or cloud control system 200 compares the signals and associated computations with its own computations to improve the estimation of that vehicle's characteristics. Process 300 proceeds from block 308 to block 310.

Block 310 updates sensor processing output for at least one of the vehicles based on the comparison. For example, based on common characteristics the process may compare powertrain specific sensors (internal information) along with weather/external information to identify system-to-system variations, aging characteristics and update the sensor processing algorithms and/or sensor output to make use of this information. Process 300 proceeds from block 310 and returns to start 302 to repeat process 300.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method, comprising:
   determining information based on sensor data collected by each of two or more vehicles operating within a predetermined range of one another;
   communicating the information from at least one of the two or more vehicles to at least one of a vehicle controller of the other two or more vehicles and a cloud computing control system;
   comparing the information from the at least one of the two or more vehicles with the information from the other of the two or more vehicles;
   diagnosing a sensor error of a sensor of the other of the two or more vehicles based on the comparison of the information; and
   updating a sensor processing output for the other of the two or more vehicles based on the diagnosis to correct the sensor error of the sensor.

2. The method of claim 1, wherein the information includes external static information including one or more of: map based data, road grade, intersection location, entrance and exit ramp location, road curvature, charging locations, fueling locations, construction areas, speed limits, stop sign locations, and route patterns.

3. The method of claim 1, wherein the information includes external dynamic information including one or more of: traffic conditions, speed limits, wind conditions, weather conditions, traffic signal conditions, and fuel price.

4. The method of claim 1, wherein the information is grade information at a location of the two or more vehicles and the updated sensor processing output is a road grade estimate.

5. The method of claim 1, further comprising updating an estimate of a vehicle characteristic based on the updated sensor output.

6. The method of claim 1, wherein the two or more vehicles each include a vehicle controller, wherein the vehicle controllers are in communication with at least one of one another and a cloud computing control system.

7. The method of claim 1, wherein the cloud computing control system couples with an intelligent transport system integrating the information and the communication with a transportation infrastructure.

8. An apparatus, comprising:
   multiple vehicle controllers operating within a predetermined range of one another, each of the multiple vehicle controllers associated with a corresponding one of multiple vehicles;
   multiple sensors coupled to corresponding ones of the multiple vehicle controllers, each of the multiple sensors structured to provide an output of data utilized to determine information regarding operation of the corresponding one of the multiple vehicles;
   one or more of a cloud computing control system and the multiple vehicle controllers being configured to execute a comparison of the output of data between at least two of the multiple sensors corresponding to at least two of the multiple vehicles and communicate the comparison of the output data to at least one of the at least two multiple vehicle controllers; and
   the at least one of the at least two multiple vehicle controllers being configured to diagnose a sensor error of at least one of the multiple sensors coupled thereto based on the comparison of the output data and update an output of the at least one of the multiple sensors coupled thereto based on the diagnosis to correct the sensor error.

9. The apparatus of claim 8, wherein the information includes external static information including one or more of: map based data, road grade, intersection location, entrance and exit ramp location, road curvature, charging locations, fueling locations, construction areas, speed limits, stop sign locations, and route patterns.

10. The apparatus of claim 8, wherein the information includes external dynamic information including one or more of: traffic conditions, speed limits, wind conditions, weather conditions, traffic signal conditions, and fuel price.

11. The apparatus of claim 8, wherein the information is grade information at a location of the multiple vehicles and the updated output of the least one of the multiple sensors is a road grade estimate.

12. The apparatus of claim 8, wherein the at least one of the multiple vehicle controllers is further configured to update an estimate of a vehicle characteristic based on the updated sensor output.

13. A system comprising:
   at least two vehicles;
   at least two controllers associated with respective ones of the at least two vehicles, the at least two controllers each configured to receive data from a sensor associated with the respective vehicle;
   wherein each of the at least two controllers is configured to communicate the data from the respective sensor to at least one of the other of the at least two controllers and a cloud based control system; and
   wherein one or more of the cloud based control system and the at least two controllers is configured to compare the data from the sensor of at least one of the at least two vehicles with the data of the sensor of the other of the at least two vehicles, diagnose a sensor error of the sensor of the at least one of the at least two vehicles based on the comparison of the data, and update a sensor processing output for the controller of the other of the at least two vehicles to correct the sensor error.

14. The system of claim 13, wherein the data includes external static information including one or more of: map based data, road grade, intersection location, entrance and exit ramp location, road curvature, charging locations, fueling locations, construction areas, speed limits, stop sign locations, and route patterns.

15. The system of claim 13, wherein the data includes external dynamic information including one or more of: traffic conditions, speed limits, wind conditions, weather conditions, traffic signal conditions, and fuel price.

16. The system of claim 13, wherein the data includes grade information at a location of the at least two vehicles and the updated sensor processing output is a road grade estimate.

17. The system of claim 13, wherein the one or more of the cloud based control system and the at least two controllers is configured to estimate a vehicle characteristic based on the updated sensor output.

18. The system of claim 13, wherein the cloud based control system is coupled with an intelligent transport system structured to integrate the data and communicate with a transportation infrastructure and the intelligent transport systems includes a data collection layer, a data aggregation and translation layer, and an information dissemination layer.

19. The system of claim 13, wherein the at least two controllers are configured to average the data from the sensors outputs and update the sensor processing output based on the average.

20. The method of claim 1, wherein the sensor error is a faulty output of the sensor.

* * * * *